Oct. 24, 1944.　　A. A. FLICK, JR., ET AL　　2,361,017
SYSTEM AND APPARATUS FOR CONTROLLING ILLUMINATING DEVICES
Filed May 14, 1941　　3 Sheets-Sheet 1
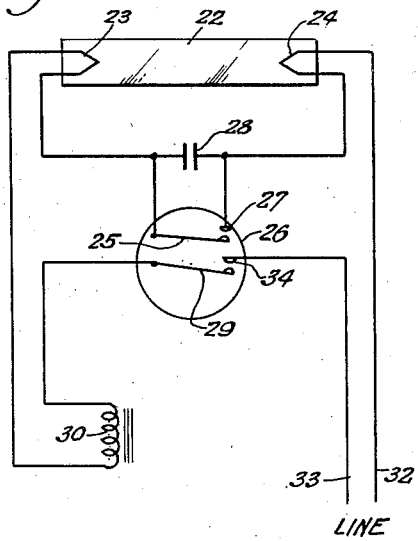
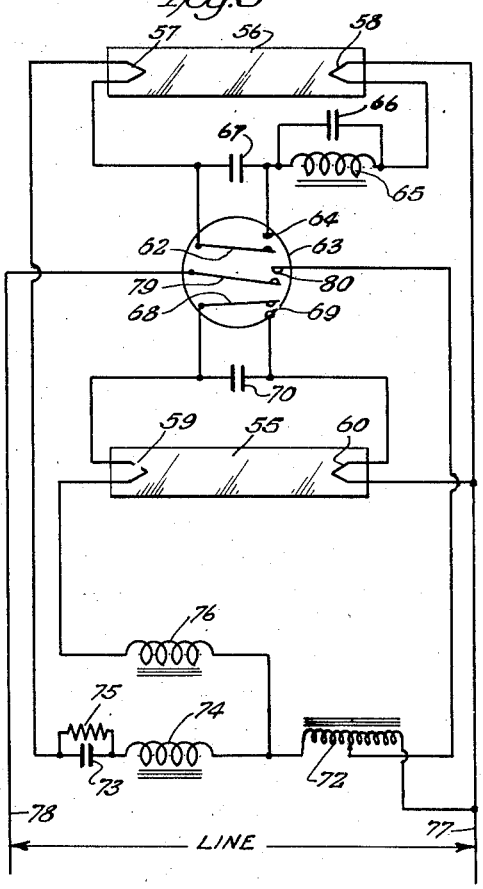
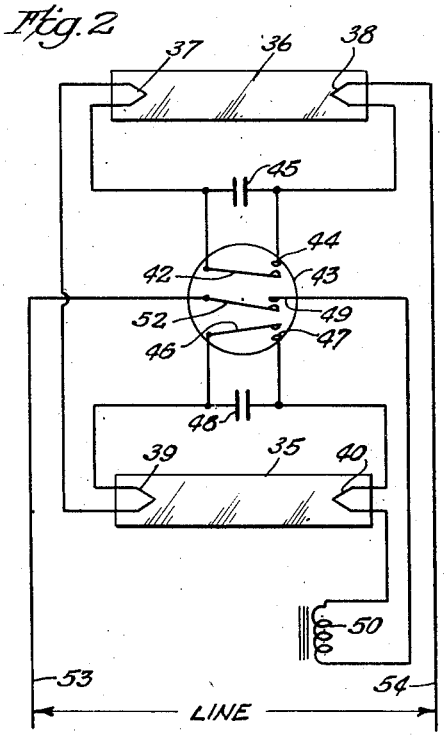
Inventors.
Augustine A. Flick, Jr.
Martin B. Grout
their Atty.

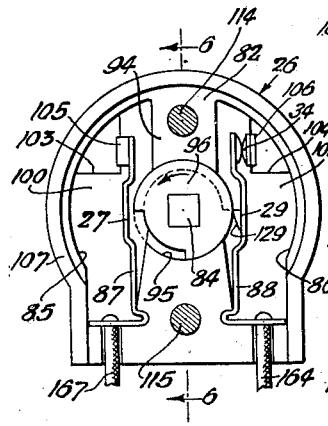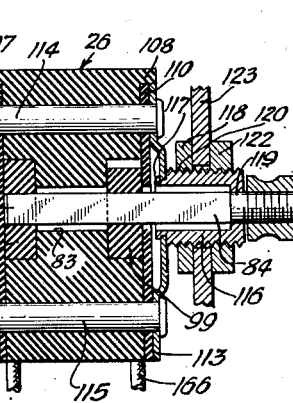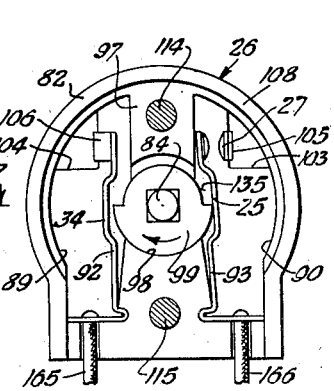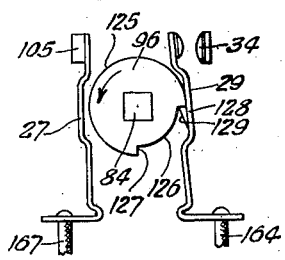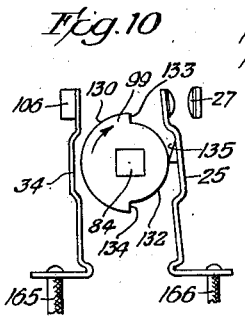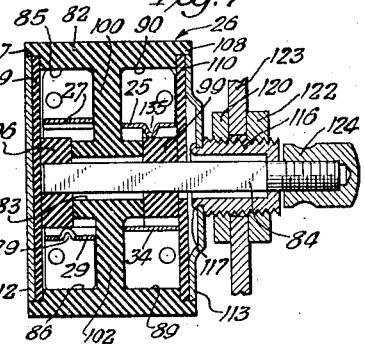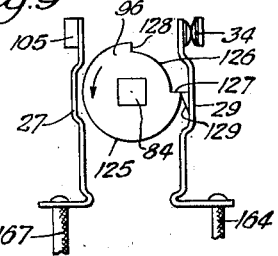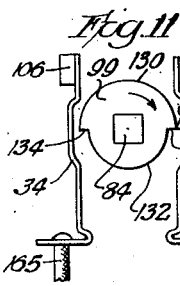

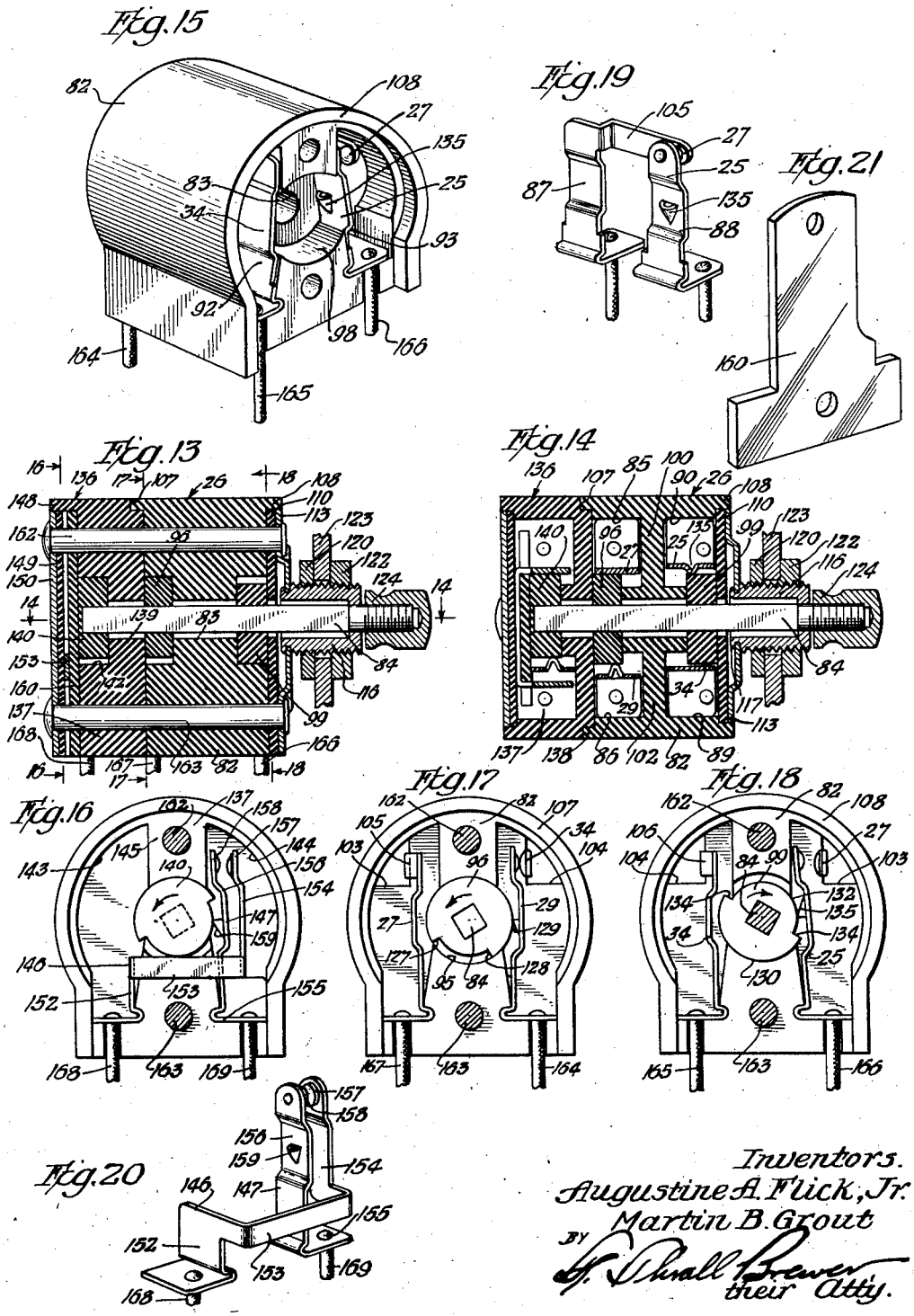

Patented Oct. 24, 1944

2,361,017

UNITED STATES PATENT OFFICE 2,361,017

SYSTEM AND APPARATUS FOR CONTROLLING ILLUMINATING DEVICES

Augustine A. Flick, Jr., Glenview, and Martin B. Grout, Chicago, Ill., assignors to Jefferson Electric Company, Bellwood, Ill., a corporation of Illinois Application May 14, 1941, Serial No. 393,388

2 Claims. (Cl. 315—98)

This invention relates to a system and apparatus for controlling illuminating devices and more particularly to a system and apparatus for controlling the starting and operation of gas discharge illuminating devices having hot cathodes.

Illuminating units including hot cathode discharge tubes, such as fluorescent lamps, are usually made to include one or a pair of such fluorescent lamps or multiples thereof. The characteristics of the fluorescent lamps are such that to prolong tube life the hot cathodes or filaments should be heated for a short period of time before the gas discharge within the tube is commenced. The proper or preferred time for heating the cathodes of the tubes is short, as for example a few seconds, while the operating time of the tube is indeterminate. While the characteristics of the tubes have been known and various electrical and thermostatic devices have been devised automatically to control the starting and operation of such hot cathode discharge tubes, the currents utilized necessarily make such automatic control devices very delicate and consequently expensive and not particularly dependable in operation.

It is therefore an object of this invention to provide a system for controlling the starting and operation of hot cathode gas discharge lamps which includes a manually actuated and controlled switching device for effecting control of the timing and operation of cathode heating and operation of such lamps.

Another object of this invention is to provide a system for controlling the starting and operation of hot cathode gas discharge lamps which includes a manually operable and controlled timing means for controlling the timing of cathode heating and operation of such lamps by the inclusion of suitably proportioned cam elements in the timing means.

Another object of this invention is to provide a system adapted to the manual control of the starting and operation of one or a pair of hot cathode gas discharge lamps or multiples of those numbers of lamps.

Another object of this invention is to provide a manually controlled switch having a plurality of contacts and cam elements for actuating the contacts in response to manual movement of an actuating member for controlling the starting and operation of a hot cathode gas discharge lamp.

Another object of this invention is to provide a manually controlled switch having a plurality of sets of contacts and cam means actuated by a manually actuated operating member for simultaneously controlling the starting and operation of a plurality of hot cathode gas discharge lamps.

Further objects and advantages of the present invention will be apparent from the following description, reference being had to the accompanying drawings wherein a preferred embodiment of the present invention is clearly shown.

In the drawings:

Figures 1, 2 and 3 are schematic circuit diagrams which are illustrative of the systems adapted to the control of one or more hot cathode type gas discharge tubes through the use of the control apparatus disclosed herein;

Figures 4 and 5 are respectively back and front views of the preferred form of switch adapted to the control of a single hot cathode type gas discharge tube, with the covers removed to show the internal structure thereof;

Figures 6 and 7 are respectively sectional views of the switch shown in Figures 4 and 5 with the switch covers in place and the sections taken substantially on the lines 6—6 of Figure 4 and 7—7 of Figure 6, looking in the direction of the arrows in each instance;

Figures 8 and 9 are fragmentary or diagrammatic views illustrating different operating positions of the switch contacts shown in Figure 4;

Figures 10 and 11 are fragmentary or diagrammatic views showing different operating positions of the contacts shown in Figure 5, said positions shown in Figures 10 and 11 corresponding respectively to those shown in Figures 8 and 9;

Figure 12 is a diagrammatic view which illustrates a preferred operating cycle of the switch shown in Figures 4 to 7 inclusive;

Figures 13 and 14 are sectional views of a preferred type of switch adapted to the control of a plurality of hot cathode type gas discharge tubes; Figure 13 being a side sectional view and the section of Figure 14 being taken substantially on a line 14—14 of Figure 13 and looking in the direction indicated by the arrows;

Figure 15 is a perspective view of a portion of the switch shown in Figures 13 and 14;

Figures 16, 17 and 18 are corresponding views of the internal structure of the switch shown in Figures 13 and 14 at the positions indicated respectively by the lines 16—16, 17—17 and 18—18 of Figure 13 when viewed in the directions indicated by the arrows;

Figures 19 and 20 are perspective views of internal operating parts of the switch shown in Figures 13 and 14; and Figure 21 is a perspective view of a part of the switch shown in Figures 13 and 14.

Referring to Figure 1, a hot cathode type gas discharge tube 22 such as the type known as fluorescent lamps has filament type cathodes 23 and 24. One side of the cathode 23 is connected to a contact 25 of a switch 26, and one side of the cathode 24 is connected to a contact 27 of the switch 26, which contacts 25 and 27 are in alignment for engagement and normally open. A condenser 28 is connected across the switch contacts 25 and 27 to provide a by-pass for high frequency currents. The other side of the cathode 23 is connected to a contact 29 of the switch 26 through an iron core choke coil or reactor 30. The other side of the cathode 24 is connected to a power supply line lead 32, and another power supply line lead 33 is connected to a contact 34 of the switch 26 which is in alignment for engagement with the contact 29. Both of the sets of contacts, 25 and 27, and 29 and 34 are preferably actuated by a common actuating means which will be more fully described in connection with this invention.

In the operation of the circuit shown in Figure 1, both of the sets of contacts of the switch 26 are closed at the same time or the contacts 25 and 27 are closed slightly prior to the closing of the contacts 29 and 34. This closes a cathode heating circuit from the power supply line leads 32 and 33 through the choke coil or reactor 30, through both sets of contacts of the switch 26 and through the two cathodes which are connected in series through the contacts 25 and 27. This cathode heating circuit remains closed for a short interval of time, such as a few seconds, to effect the heating of the cathodes before normal operation of the gas discharge tube and discharge therein are commenced. By a continued operation of the switch 26, the contacts 25 and 27 are opened to break the series connection between the cathodes 23 and 24. This leaves the cathodes 23 and 24 connected across the power supply line leads 32 and 33 through the choke coil or reactor 30 and the contacts 29 and 34. The application of this potential across the cathodes effects a breakdown or gas discharge within the gas discharge tube 22, and the commencement of the normal operation thereof. The choke coil or reactor 30 limits the current flow through the gas discharge tube. Operation of the gas discharge tube is stopped by the opening of the contacts 29 and 34, after which the normal operation of the gas discharge tube is restarted by repetition of the described cycle of operation.

The circuit shown in Figure 2 is adapted to the series operation of two gas discharge tubes 35 and 36 which are each designed to function properly at approximately half of the potential of the power supply line. The gas discharge tube 36 has filament type cathodes 37 and 38, and the gas discharge tube 35 has filament type cathodes 39 and 40. One side of the cathode 37 is connected to a switch contact 42 of a switch 43, and one side of the cathode 38 is connected to a contact 44 of the switch 43 which is in alignment for engagement with the contact 42. A condenser 45 is connected across the contacts 42 and 44 to provide a high frequency by-pass across the contacts. The other side of the cathode 37 is connected to one side of the cathode 39 of the gas discharge tube 35. The other side of the cathode 39 is connected to a contact 46 of the switch 43, which contact is in alignment for engagement with a contact 47. The contact 47 is connected to one side of the cathode 40. A condenser 48 is connected across the contacts 46 and 47 to provide a high frequency by-pass across the contacts. The other side of the cathode 40 is connected to a contact 49 of the switch 43 through an iron core choke coil or reactor 50. The contact 49 is in alignment for engagement with a contact 52 which is connected to a power supply line lead 53. Another power supply line lead 54 is connected to one side of the cathode 38. All of the contacts of the switch 43 are preferably actuated by a single manually operable actuating member, as will be more fully described. Also, the contacts all close simultaneously or the contacts 42 and 44 and the contacts 46 and 47 close slightly prior to the closing of the contacts 49 and 52.

In the operation of the circuit of Figure 2, the closing of all of the contacts of the switch 43 closes a starting or cathode heating circuit for the gas discharge tubes by connecting all of the cathodes of the gas discharge tubes in series across the power supply line leads 53 and 54 through the choke coil or reactor 50. All of the contacts of the switch 43 remain closed for only a short interval of time during which the cathodes are heated. The contacts 42 and 44 and the contacts 46 and 47 are opened at substantially the same time to break the series circuits between the cathodes 37 and 38 and the cathodes 39 and 40, respectively. Upon the breaking of these series circuits between the cathodes without opening the contacts 49 and 52, the potential from the power supply line leads 53 and 54 is supplied across the cathodes of the gas discharge tubes 35 and 36 in series. That is, when the gas discharge tubes 35 and 36 are connected in series across the power supply line leads 53 and 54, the line potential effects a breakdown or discharge within the gas discharge tubes, and the choke coil or reactor 50 limits the current flow through the gas discharge tubes following the commencement of discharge. Operation of the gas discharge tubes is stopped by the operation of the switch 43 to open the contacts 49 and 52.

The circuit shown in Figure 3 is adapted to the parallel operation of gas discharge tubes 55 and 56. The gas discharge tube 56 has filament type cathodes 57 and 58 and the gas discharge tube 55 has filament type cathodes 59 and 60. One side of the cathode 57 is connected to a contact 62 of a switch 63 which is in alignment for engagement with a contact 64 of the switch. One side of the cathode 58 is connected to the contact 64 through a starting compensator which comprises an iron core choke coil or reactor 65 having a condenser 66 connected in parallel therewith. A condenser 67 is connected across the contacts 62 and 64. One side of the cathode 59 of the gas discharge tube 55 is connected to a contact 68 of the switch 63 which is in alignment for engagement with a contact 69 of the switch. One side of the cathode 60 is connected to the contact 69. A condenser 70 is connected across the contacts 68 and 69. The other side of the cathode 57 is connected to a secondary or output terminal of an auto transformer 72 through a condenser 73 and an iron core choke coil or reactor 74, which condenser and choke coil or reactor are connected in series. A resistor 75 which has a high resistance value is preferably connected across the condenser 73 to serve as a bleeder which discharges the condenser 73 when the circuit is not in operation. The other side of the cathode 59 is connected to the secondary or output terminal of the auto transformer 72 through an iron core choke coil or reactor 76. A power supply line lead 77 is connected to one side of each of the cathodes 58 and 60 and to the common input and output terminal of the auto transformer 72. A power supply line lead 78 is connected to a contact 79 of the switch 63 which is in alignment for engagement with a contact 80 of the switch. The contact 80 is connected to an input terminal of the auto transformer 72. The auto transformer 72 is disclosed herein and is utilized where the potential between the power supply line leads 77 and 78 is different than that required for proper operation of the gas discharge tubes 55 and 56. If the potential provided across the power supply line leads is within the operating potential limits for the gas discharge tubes, the circuit is similar, except that the transformer 72 is omitted and the contact 80 is connected directly to the choke coils or reactors 74 and 76.

In the operation of the circuit shown in Figure 3, the contacts of the switch 63 all close at the same time or the contacts 62 and 64 and the contacts 68 and 69 close slightly before the contacts 79 and 80. When all of the contacts are closed, the cathodes 59 and 60 of the gas discharge tube 55 are connected in series across the output terminals of the auto transformer 72 through the choke coil or reactor 76; and the cathodes 57 and 58 of the gas discharge tube 56 are connected in series through the starting compensator which comprises the choke coil 65 and condenser 66 and across the output terminals of the auto transformer 72 through the condenser 73 and choke coil 74. The contacts 62 and 64 and the contacts 68 and 69 remain closed for only a short period of time to effect preliminary heating of the cathodes. When these contacts open, the series connection of the cathodes of each of the gas discharge tubes is broken and the potential from the output terminals of the auto transformer 72 is applied across the cathodes of each of the tubes to start the gas discharge within the tubes. The condenser 73 preferably has a capacitive reactance which is greater than the inductive reactance of the choke coil 74, thus providing a normal preponderance of capacitive reactance in the operating circuit of the gas discharge tube 56. The preponderance of capacitive reactance in the circuit of the gas discharge tube 56 and the inductive reactance provided by the choke coil 76 in the circuit of the gas discharge tube 55 dephases the light pulses of the gas discharge tubes and improves the power factor of the combination. The choke coil 65 adds inductive reactance to the series circuit between the cathodes 57 and 58 to increase the cathode heating current by an amount such that the cathodes of the two tubes become heated in substantially the same time interval. The condenser 66 which is connected across the choke coil 65 is a small high frequency by-pass condenser.

Figures 4 to 11 inclusive disclose a preferred form of switch adapted to the control of a single gas discharge tube of the hot cathode type in a circuit such as that disclosed in Figure 1. In referring to Figures 4 to 11 inclusive, reference numerals similar to those previously used refer to like parts. The switch 26 has a body 82 of insulating material which is preferably molded phenol fiber having a central opening 83 therethrough for the accommodation of a switch actuating shaft 84. The insulating body 82 has recesses 85 and 86 at one end thereof and on opposite sides of the shaft 84 in which the resilient supporting elements 87 and 88 of the contacts 27 and 29 respectively are mounted. Recesses 89 and 90 are provided in the other end of the body 82 on opposite sides of the shaft 84 in which resilient supporting elements 92 and 93 of the contacts 34 and 25 respectively are mounted. A partition 94 between the recesses 85 and 86 has a substantially circular recess 95 therein in which a cam 96 is mounted for rotation with the shaft 84. A partition 97 between the recesses 89 and 90 has a substantially circular recess 98 therein in which a cam 99 is mounted for rotation with the shaft 84. Partitions 100 and 102 separate the recesses 85 and 90 and the recesses 86 and 89 respectively and have openings 103 and 104 therein through which angularly extending portions 105 and 106 of the resilient supporting elements 87 and 92 extend to positions such that the contacts 25 and 27 and the contacts 29 and 34 are in alignment for engagement.

Flanges 107 and 108 on the ends of the body 26 are provided to locate insulating end covers 109 and 110 and cover plates 112 and 113, which insulating covers and end plates are held in position by rivets 114 and 115 or other suitable fastening means which extend through the insulating covers, end plates and body. A hollow stud 116 having a threaded outer surface is secured to the end cover 113 preferably by an end 117 which extends through a central opening 118 in the cover 113 and is riveted or rolled over. The hollow stud 116 provides a bearing 119 for the shaft 84 and accommodates nuts 120 and 122 for securing the switch to a mounting support such as that indicated at 123 in Figures 6 and 7. A knob 124 is threaded onto a projecting end of the shaft 84 adjacent the stud 116 for manually rotating the shaft to operate the switch.

The cam 96 has an arcuate surface 125 which preferably covers approximately 270 degrees and has a notched or recessed portion 126 which preferably covers approximately 90 degrees or the remainder of the completed cam surface. Surfaces or shoulders 127 and 128 at the ends of the notched or recessed portions preferably extend radially to provide abrupt or sharp terminating surfaces for the notched or recessed portion. A pawl or camming surface 129 is preferably integral with the contact 29 and cooperates with the cam 96 as it is rotated in its normal direction, as indicated by the arrow, to close the contacts 29 and 34 when in engagement with the arcuate surface 125 of the cam and open the contacts 29 and 34 when in the notched or recessed portion 126 of the cam. The pawl or camming surface 129 is preferably abruptly terminated to engage the shoulder 128 and thereby prevent reverse rotation of the cams from the position of their engagement. The cam 96 effects closure of the contacts 29 and 34 during approximately 270 degrees of the rotation of the shaft 84 and cam; the contacts being open during the remainder of the complete cycle of rotation.

The cam 99 has an arcuate surface 130 which preferably extends for approximately 180 degrees and a notched or recessed portion 132 which extends for the remainder of the complete surface. As in the case of the cam 96, the arcuate surface 130 is preferably abruptly terminated by radially extending surfaces or shoulders 133 and 134. A pawl or camming surface 135 is preferably integral with the contact 125 and cooperates with the cam 99 to hold the contacts 25 and 27 closed during the engagement thereof with the cam surface 130. In the switch disclosed, the cam 99 holds the contacts 25 and 27 closed during approximately 180 degrees of the rotation of the shaft 84 and those contacts are open during the remainder of the complete cycle of rotation of the shaft.

Figures 8 and 9 show different operating positions of the cam 96 and contacts 29 and 34; while Figures 10 and 11 show different operating positions of the cam 99 and contacts 25 and 27. Referring to Figure 12, as well as to Figures 8 to 11 inclusive, Figures 9 and 11 show corresponding positions of the cams 96 and 99 respectively when they first close their respective contacts to close both the line and series cathode heating circuits, as described with respect to Figure 1. As the reasonably uniform rotation of the shaft 84 is produced by manual rotation of the knob 124, the cathode heating or filament contacts 25 and 27 remain closed during approximately 130 degrees of the shaft rotation, at the end of which the pawl 135 clicks into the recessed portion 132 of the cam 99 to open the cathode heating circuit through the contacts 25 and 27. The line circuit contacts remain closed during approximately 180 degrees of the shaft rotation, at the end of which the pawl 135 clicks into the recessed portion 132 of the cam 99 to open the cathode heating circuit through the contacts 25 and 27. The line circuit contacts remain closed during the next 90 degrees of the rotation of the shaft. However, the click provided by the opening of the contacts 25 and 27 provides a signal indicating the stopping position for the switch to leave the gas discharge tube lamp connected for normal operation. When the lamp is to be turned off, continued rotation of the shaft in the same direction lets the pawl 128 snap into the recessed portion 125 of the cam 96 to open the contacts 29 and 34. The click provided by the snap opening of the contacts 29 and 34 provides a signal for indication that the switch is in the "off" position. The "off" position preferably covers approximately 90 degrees of the rotation of the shaft.

Referring to Figures 15 to 21 inclusive, reference numerals similar to those previously used refer to like parts which perform similar functions. The switch 26 which is shown in Figures 4 to 7 inclusive and was previously described, except for the insulating end cover 109 and cover plate 112 is incorporated as a section of the switch shown in Figures 13 to 21 inclusive. The switch body 82, cams 96 and 99, the contacts 25, 27, 29 and 34 and the switch actuating structure are the same, except that the shaft 84 of the switch shown in Figures 13 and 14 is longer and projects into an additional switch section 136 which is added to the end of switch 26. The switch section 136 includes an insulating body 137 which preferably has the same outer contour as the insulating body 82 and has a recessed end portion 138 which fits together with the flange 107 on the body 82. The shaft 84 extends through a central opening 139 in the body 136 and fits into a cam 140 which is rotatably supported in a recess 142 in the switch body. Recesses 143 and 144 are provided in the body 136 on opposite sides of the cam 140 and a central partition 145 in which contact elements 146 and 147 are mounted. The body 136 also has an end flange 148 for locating an insulating cover 149 and an end cover 150.

The contacts 146 and 147 correspond to the contacts 46 and 47 of Figure 2 or the contacts 68 and 69 of Figure 3. In the structure, the contact element 146 has an end portion 152 anchored in the recess 143, and angularly projecting portion 153 extending across to the recess 144 and a resilient contact carrying portion 154. The contact element 147 has a base portion 155 anchored in the recess 144 and a resilient contact carrying portion 156. The resilient contact carrying portions 154 and 156 have contacts 157 and 158 respectively secured thereto in alignment for engagement and normally biased apart. The resilient contact carrying portion 156 has a pawl or cam element 159 which is preferably integral therewith and is adapted to cooperate with the cam 140 to effect the engagement of the contacts 157 and 158. A block of insulating material, shown in Figure 21, fits between the angularly projecting portion 153 of the contact element 146 and the contact element 147 to maintain the separation of those contact elements.

The cam 140 is preferably similar to the cam 99 and effects engagement and disengagement of the contacts 157 and 158 at the same time as the contacts 25 and 27 engage and disengage. Figures 16, 17 and 18 show corresponding relative positions of the cams 96, 99 and 140 at one point of the switch operating cycle. The parts of the switch shown in Figures 13 and 14 are held in assembled relation by rivets 162 and 163 or other suitable fastening means.

In the switch illustrated in Figures 4 to 7 inclusive and also in the switch illustrated in Figures 13 to 18 inclusive, connections are made to the line circuit control contacts 29 and 34 which are actuated by a cam 96 through leads 164 and 165. The circuit connections to the starting circuit control contacts 25 and 27 are made through leads 166 and 167. The circuit connections for the starting circuit control contacts 157 and 158 of the switch shown in Figures 13 to 18 are made through leads 168 and 169.

To accomplish the operation of the switch described with respect to Figures 1, 2 and 3, it is understood that the cam proportions may be varied somewhat without preventing proper operation of the gas discharge tube lamp. As a matter of fact, the cam proportions should be such that for average manual rotation of the switch knob, the proper heating time for the cathodes is provided and a particular or critical position for normal lamp operation is avoided.

While the embodiment of the present invention as herein disclosed, constitutes a preferred form, it is to be understood that other forms might be adopted, all coming within the scope of the claims which follow.

What is claimed is:

1. In a system and apparatus for controlling the starting and operation of an illuminating device having a power supply line, a gas discharge illuminating device having hot cathodes, and a choke coil, the combination of a switch having a set of line circuit control contacts and a set of starting circuit control contacts, said choke coil being connected in series with and between one side of the power supply line and one of the cathodes, the other cathode being connected to the other side of the power supply line, the line circuit control contacts being connected in series with one side of the power supply line, the starting circuit control contacts being connected in series with and between the cathodes to provide a series connection of the cathodes across the power supply line when they are closed, and a manually rotatable shaft having cams mounted thereon to be driven thereby, each of said cams being adapted to effect closing and opening of its corresponding set of contacts upon rotation of the shaft, the contours and relative positions of said cams being such that during one revolution of the shaft both sets of contacts are closed at substantially the same time and remain closed for approximately half of a revolution of the shaft, the line circuit contacts remain closed and the starting circuit contacts are opened and remain opened during approximately the next quarter turn of the shaft and both sets of contacts are open during approximately the final quarter turn of the shaft.

2. In a system and apparatus for controlling the starting and operation of a hot cathode type of gas discharge illuminating device, the combination comprising a switch having two sets of contacts normally biased to the open position for controlling the starting and operation of the illuminating device, said switch including a manually rotatable shaft having cams mounted thereon adjacent each of the sets of contacts for controlling the closing and opening of the contacts as the shaft is rotated, said cams being positioned and shaped to effect closure of both of the sets of contacts at substantially the same time, one of said cams holding one of the sets of contacts closed during approximately 180 degrees of the shaft rotation, and the other of said cams holding the other of the sets of contacts closed during approximately 270 degrees of the shaft rotation.

AUGUSTINE A. FLICK, Jr.
MARTIN B. GROUT.